(12) United States Patent  
Alfraih et al.

(10) Patent No.: US 11,671,836 B2  
(45) Date of Patent: Jun. 6, 2023

(54) GEOLOCATION BASED FILE ENCRYPTION

(71) Applicant: Saudi Arabian Oil Company, Dhahran (SA)

(72) Inventors: Mohammed Alfraih, Dhahran (SA); Aasim Ajaz, Dhahran (SA)

(73) Assignee: Saudi Arabian Oil Comapny, Dhahran (SA)

( * ) Notice: Subject to any disclaimer, the term of this patent is extended or adjusted under 35 U.S.C. 154(b) by 100 days.

(21) Appl. No.: 17/026,987

(22) Filed: Sep. 21, 2020

(65) Prior Publication Data

US 2022/0095102 A1     Mar. 24, 2022

(51) Int. Cl.
```
H04W 12/63    (2021.01)
G06F 16/13    (2019.01)
G06F 21/60    (2013.01)
H04L 9/32     (2006.01)
```

(52) U.S. Cl.
CPC ............ *H04W 12/63* (2021.01); *G06F 16/13* (2019.01); *G06F 21/602* (2013.01); *H04L 9/3226* (2013.01)

(58) Field of Classification Search
CPC .................................................. H04L 61/2542
See application file for complete search history.

(56) References Cited

U.S. PATENT DOCUMENTS

| | | | |
|---|---|---|---|
| 6,023,506 A * | 2/2000 | Ote | G06F 21/6209 380/45 |
| 6,931,130 B1 * | 8/2005 | Kraft, IV | H04L 9/0872 380/258 |
| 6,948,062 B1 * | 9/2005 | Clapper | H04L 9/0872 713/168 |
| 9,923,719 B2 * | 3/2018 | Kumar | H04L 9/3263 |
| 10,403,063 B2 | 9/2019 | Drako et al. | |
| 2003/0120940 A1 * | 6/2003 | Vataja | H04L 67/52 380/258 |
| 2004/0123150 A1 | 6/2004 | Wright et al. | |
| 2006/0288424 A1 * | 12/2006 | Saito | H04N 21/8355 375/E7.009 |

(Continued)

FOREIGN PATENT DOCUMENTS

EP     2950231     12/2015

OTHER PUBLICATIONS

Scott and Denning, "A Location Based Encryption Technique and Some of Its Applications," ION NTM, Jan. 22-24, 2003, 7 pages.

(Continued)

*Primary Examiner* — William S Powers  
(74) *Attorney, Agent, or Firm* — Fish & Richardson P.C.

(57) ABSTRACT

The present disclosure describes a computer-implemented method that includes: receiving data encoding a current geolocation of a mobile computing device, a classification status of one or more files on the mobile computing device being requested by a user of the mobile computing device, and a current network domain on which the mobile computing device is registered; and based on the current geolocation of the mobile computing device, the classification status of the one or more files on the mobile computing device, and the current network domain of the mobile computing device, determining an encryption status of the one or more files on the mobile computing device.

20 Claims, 5 Drawing Sheets

(56) References Cited

U.S. PATENT DOCUMENTS

| | | | |
|---|---|---|---|
| 2009/0075630 A1* | 3/2009 | Mclean | H04L 63/0428 |
| | | | 455/410 |
| 2013/0013932 A1 | 1/2013 | Kong et al. | |
| 2013/0091452 A1* | 4/2013 | Sorden | G06T 17/05 |
| | | | 715/771 |
| 2013/0318637 A1* | 11/2013 | Madsen | G08B 21/24 |
| | | | 726/34 |
| 2014/0006798 A1* | 1/2014 | Prakash | H04L 63/061 |
| | | | 713/189 |
| 2014/0082369 A1 | 3/2014 | Waclawsky et al. | |
| 2015/0241548 A1* | 8/2015 | Jones | G01S 5/02 |
| | | | 455/456.1 |
| 2016/0004849 A1* | 1/2016 | Lee | H04N 21/6334 |
| | | | 726/27 |
| 2016/0142532 A1* | 5/2016 | Bostick | H04W 4/021 |
| | | | 455/411 |
| 2016/0171238 A1 | 6/2016 | Sibillo | |
| 2017/0109954 A1 | 4/2017 | Drako et al. | |
| 2018/0176190 A1 | 6/2018 | Lin et al. | |
| 2019/0095352 A1* | 3/2019 | Poornachandran | |
| | | | G06F 11/1048 |

OTHER PUBLICATIONS

PCT International Search Report and Written Opinion in International Appln. No. PCT/US2021/050255, dated Jan. 4, 2021, 12 pages.

\* cited by examiner

GEOLOCATION BASED FILE ENCRYPTION

TECHNICAL FIELD

This disclosure generally relates to data security, and more specifically to the prevention of loss of sensitive data on mobile computing devices.

BACKGROUND

Network security policies are often implemented on an enterprise network to enforce data integrity and prevent data leakage.

SUMMARY

In one aspect, the present disclosure describes a computer-implemented method comprising: determining a current geolocation of a mobile computing device; determining a classification status of one or more files on the mobile computing device being requested by a user of the mobile computing device; determining a current network domain of the mobile computing device; and based on the current geolocation of the mobile computing device, the classification status of the one or more files on the mobile computing device, and the current network domain of the mobile computing device, determining an encryption status of the one or more files on the mobile computing device.

Implementations may include one or more of the following features.

In response to determining that the one or more files are to be encrypted, the computer-implemented method may include encrypting the one or more files on the mobile computing device. The computer-implemented method may include: displaying, at a user interface on the mobile computing device, an indication that the one or more files are being encrypted. The computer-implemented method may include: receiving, from the user interface on the mobile computing device, a user selection with regard to the one or more files on the mobile computing device.

The computer-implemented method may include: in response to the user selecting to open the one or more files, soliciting a passphrase from the user. The computer-implemented method may include: in response to receiving the passphrase, decrypting and opening the one or more files using the passphrase. The computer-implemented method may include: generating a log entry recording the user accessing contents of the one or more files.

The computer-implemented method may include: in response to the user selecting to not open the one or more files, keeping the one or more files encrypted on the mobile computing device; and generating a log entry recording the user attempting to access contents of the one or more files.

The computer-implemented method may include: in response to determining that the one or more files are to be opened, opening the one or more files on the mobile computing device.

In another aspect, the present disclosure describes a computer system comprising: one or more processors configured to perform operations of: determining a current geolocation of a mobile computing device; determining a classification status of one or more files on the mobile computing device being requested by a user of the mobile computing device; determining a current network domain of the mobile computing device; and based on the current geolocation of the mobile computing device, the classification status of the one or more files on the mobile computing device, and the current network domain of the mobile computing device, determining an encryption status of the one or more files on the mobile computing device.

Implementations may include one or more of the following features.

The operations may further include: in response to determining that the one or more files are to be encrypted, encrypting the one or more files on the mobile computing device. The operations may further include: displaying, at a user interface on the mobile computing device, an indication that the one or more files are being encrypted. The operations may further include: receiving, from the user interface on the mobile computing device, a user selection with regard to the one or more files on the mobile computing device.

The operations may further include: in response to the user selecting to open the one or more files, soliciting a passphrase from the user. The operations may further include: in response to receiving the passphrase, decrypting and opening the one or more files using the passphrase. The operations may further include: generating a log entry recording the user accessing contents of the one or more files.

The operations may further include: in response to the user selecting to not open the one or more files, keeping the one or more files encrypted on the mobile computing device; and generating a log entry recording the user attempting to access contents of the one or more files.

The operations may further include: in response to determining that the one or more files are to be opened, opening the one or more files on the mobile computing device.

Implementations according to the present disclosure may be realized in computer implemented methods, hardware computing systems, and tangible computer readable media. For example, a system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

The details of one or more implementations of the subject matter of this specification are set forth in the description, the claims, and the accompanying drawings. Other features, aspects, and advantages of the subject matter will become apparent from the description, the claims, and the accompanying drawings.

DESCRIPTION OF DRAWINGS

Like reference numbers and designations in the various drawings indicate like elements.

DETAILED DESCRIPTION

Figure 1:
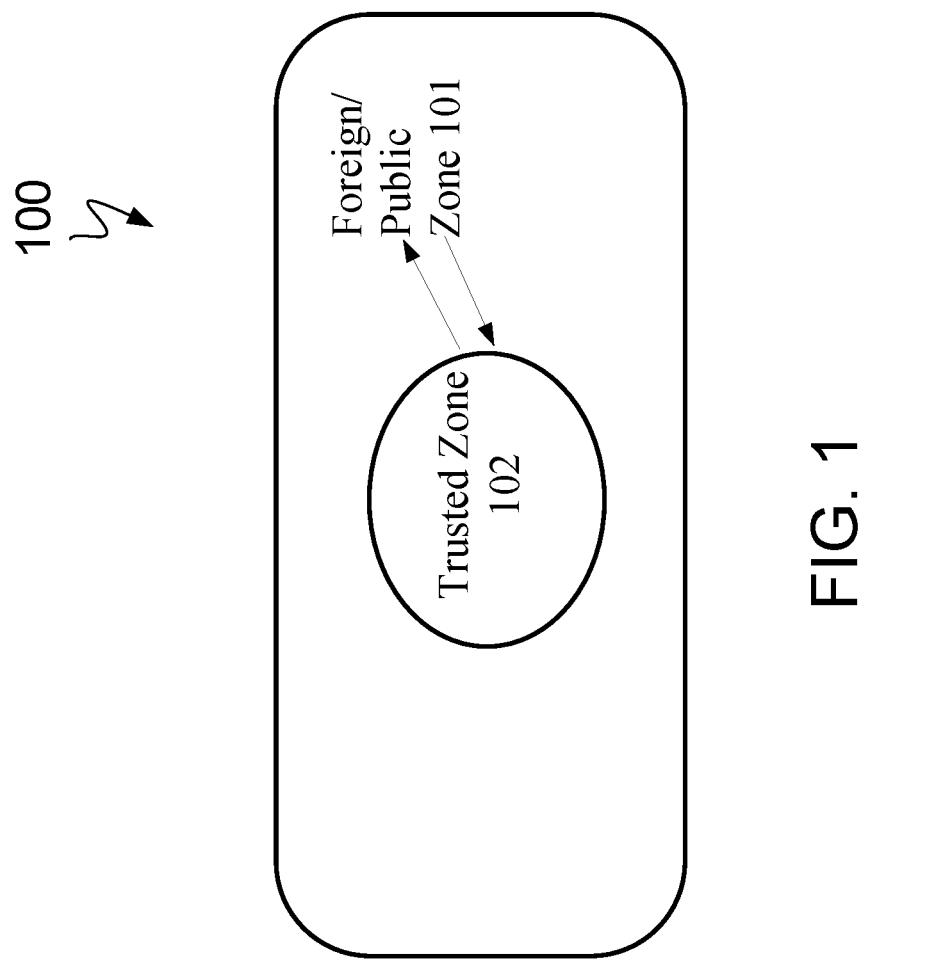
FIG. 1 illustrates an example of a diagram according to an implementation of the present disclosure.

Data Loss Prevention (DLP) can be engineered to protect critical information of an enterprise from accidental or intentional leakage resulting in long lasting severe consequences. In many cases, highly classified information may be any material for which exfiltration can result in negative financial, reputational or legal consequences. The chances of leaking a highly classified file are increased when a mobile computing device is connected to a foreign or public network. Accidental or intentional leakage can lead to a devastating outcome in terms of organization's business progress and legal implications. In these cases, legal warnings and proper classification of highly classified information may be invoked in anticipation of legal consequences in a court of law.

Classification of critical and non-critical files may be a foundation based on which content sensitivity of a file can be determined before rendering a file encryption decision. In some cases, determining geolocation of a computing device can be an integral part to prevent data leakage and assist in the decision of encrypting a file. Some implementations emphasize securing highly classified files on a mobile computing device connected to a foreign/public network or foreign/public geolocation such that data is not actively transferred over the network. The implementations described in the present disclosure can protect against data leakage and provide geolocation-based access to highly classified files. These implementations can incorporate legal disclaimer as a component to facilitate legal enforcement against data exfiltration factors.

Some implementations may monitor the status of a computing device for its geolocation, file classification and domain to which the computing device is connected. In these implementations that operate based on geolocation of the computing device, file classification and detection of network can be performed to guard against highly classified files. If a mobile computing device is not connected to a trusted zone, then files are immediately encrypted and authorized users are prompted to agree on a disclaimer of legal implication upon accessing a classified file. A log alert may be sent to corporate security operations center for verification purposes. These implementations may improve a data classification program (DCP) and introduce an extra level of security when the mobile computing device is not connected to a trusted network.

One of the main issues challenging security analysts is when a mobile computing device is connected to a foreign/public network. The fact that this network is unknown means that the network may not be trusted, and therefore access control on highly classified files on mobile computing devices should be established. Some solutions may seek simplistic blanket encryption of data at rest. In contrast, implementations described by the present disclosure may involve classification of files and predefined zones based on a geolocation of a mobile computing device, and then making a decision of whether to encrypt or decrypt a classified file.

The implementations described in the present disclosure may establish a control process to enable geolocation on a mobile computing device. Within this control process, files stored on a computing device can be properly classified and a predefined geolocation of two or more zones may be established.

Referring to FIG. 1, a diagram 100 illustrates a trusted zone 102 and public/foreign zone 101. Here, trusted zone 102 is a designated network and geolocation where a computing device is trusted on the network and vice versa. Foreign/Public zone is defined as a network with untrusted geolocation where the network is not trusted by the mobile computing device and vice versa. In some cases, the trusted zone can be determined by inference, for example, when the mobile computing device is on the corporate enterprise network without tunneling through a virtual private network (VPN). In comparison, the foreign/public zone refers to situations when, for example, the mobile computing device is accessing the corporate enterprise network by going through a VPN. As described in more detail below, implementations can determine whether the mobile computing device is within a trusted zone based on a combination of multiple factors including, for example, a current geolocation of the mobile computing device, an existing classification of the file stored on the mobile computing device, and a current domain of the mobile computing device. For illustration, a current geolocation of the mobile computing device can be identified by an internal geolocation identifier. For example, an administration process can define zone 102 (trusted zones). The administration process can include a policy or a push mechanism driven by a central server to push out the internal geolocation identifier and the definition of zones 102. The administration process can treat this data as whitelist of all allowed geolocation.

A mobile computing device can include a computing device that is movable, for example, a smartphone device, a pad device, or a laptop device. Because mobile computing devices are by definition on the move, mobile computing devices are at a higher risk of exfiltration of highly classified files. By allocating a trusted zone based on the combination of a geolocation determination, a commensurate classification of files, and a verification of domain services, implementations incorporate an approach to encrypt and/or decrypt files that is more practical than other approaches that depend on a singular factor. To account for legal proceedings against data exfiltration and non-repudiation; a disclaimer of legal implication may be displayed if a mobile computing device is, for example, at a geolocation that corresponds to a public/foreign zone before decrypting a highly classified file.

Figure 2:
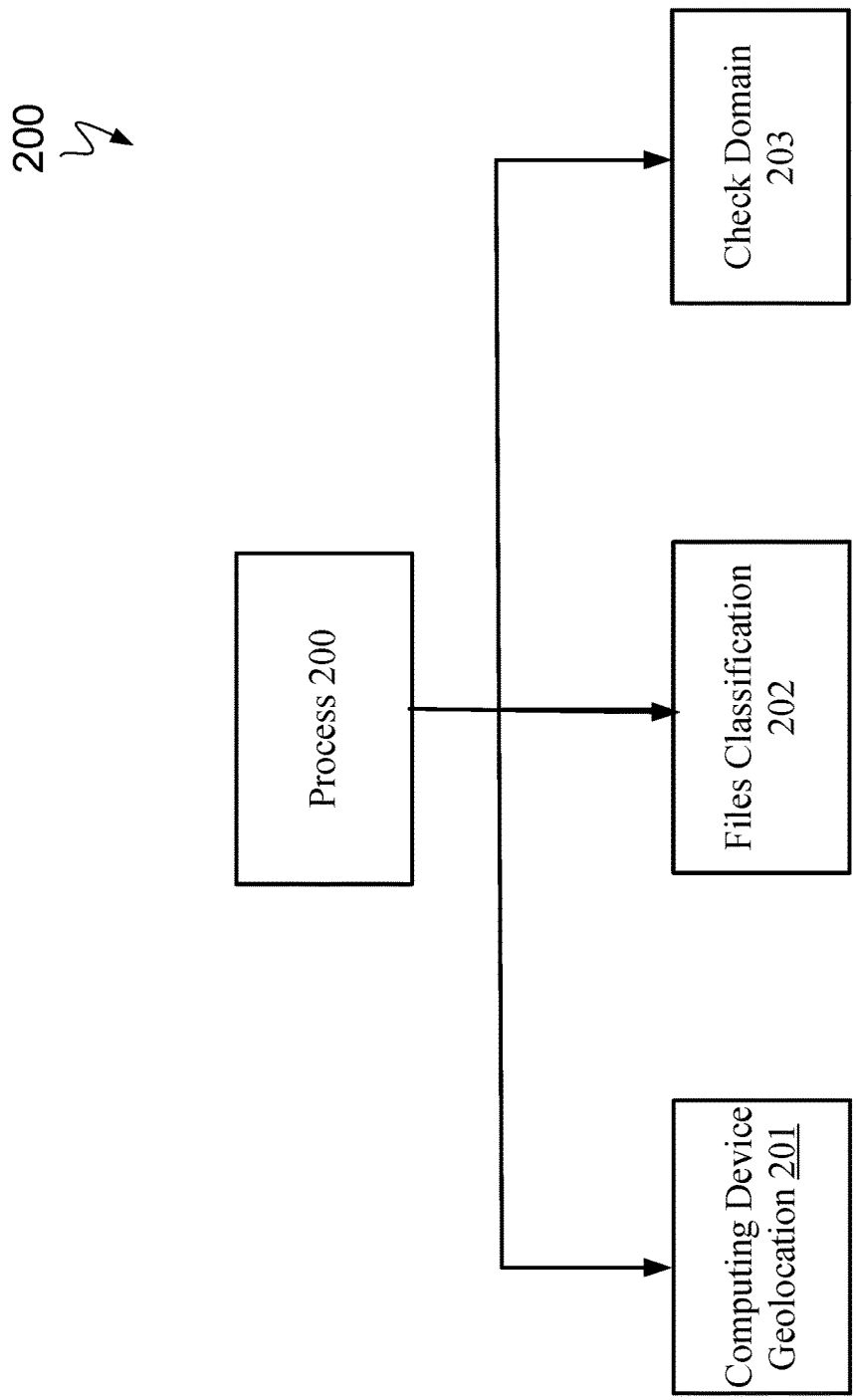
FIG. 2 illustrate another example of a diagram according to an implementation of the present disclosure.

Further referring to FIG. 2, some implementations may involve a background process 200 on a mobile computing device that constantly monitors critical file classification (202), a geolocation of the mobile computing device (201), and a current domain of the mobile computing device (203). For example, the mobile computing device may incorporate a global positioning system (GPS) functionality or a 5G functionality to report realtime geolocation information of the mobile computing device. In some cases, the criticality of a file depends on the data contents. For example, when the data contents contain sensitive information, the file can be classified as critical. In most cases, the file classification is determined before a copy of the file is downloaded to the mobile computing device. In other words, once the file classification is set on the mobile computing device, the classification status cannot be changed by the user. Generally, files are classified by either the owner of the document or a data leakage program that automatically scans the document for keywords or any other means of file classification. In some implementations, a domain may refer to a particular domain as used by a specific domain service. For example, a domain may be a Network Active Directory domain, as used by Active Directory Domain Services. In some cases, the determination of current geolocation is triggered whenever the mobile computing device moves. Additionally or alternatively, the geolocation may be updated only when the mobile computing device experiences a change in its current domain configuration, for example, when the mobile computing device is covered by different domains. Once connected the foreign network, the process is triggered to detect and check this change to make a decision. For instance, corporate geolocation and a nearby coffee shop with network access can be opened. Both can be on the same geolocation but only one can have a valid active directory domain membership.

Figure 3A:
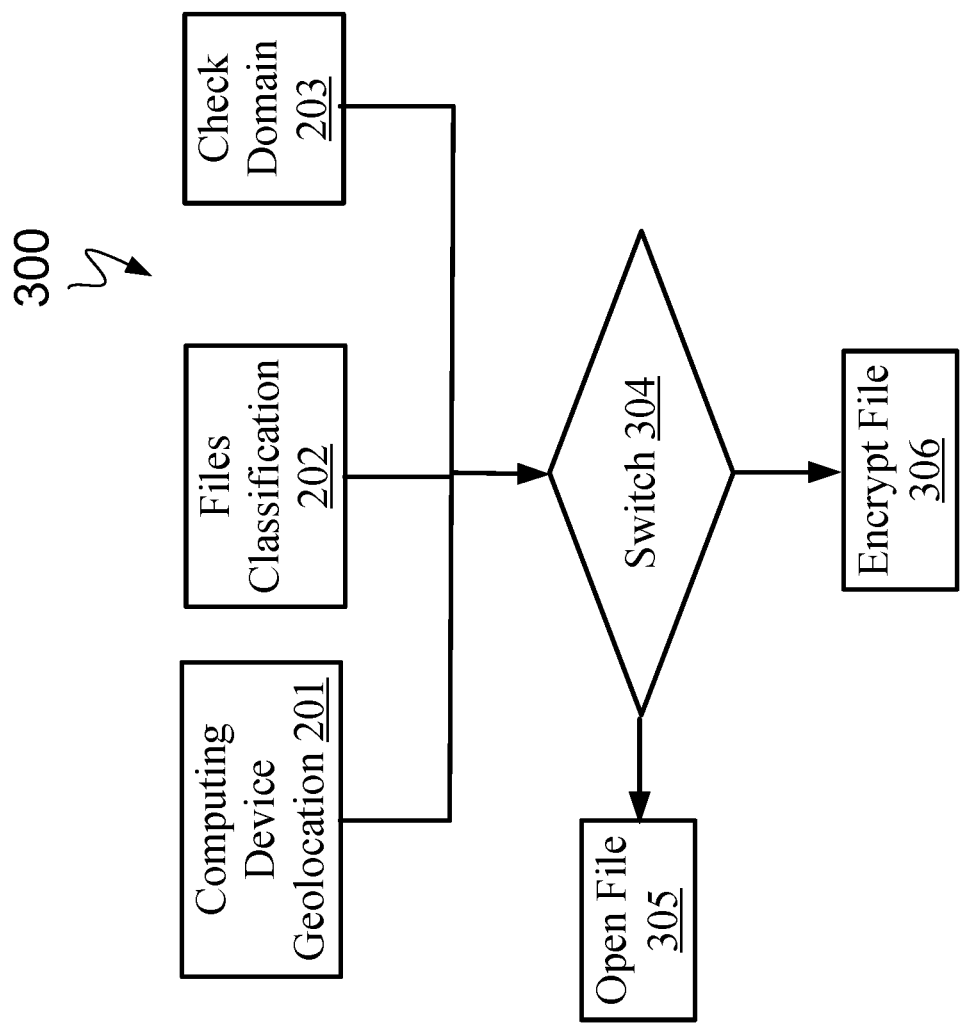
FIGS. 3A to 3B illustrate examples of flow charts according to an implementation of the present disclosure.

Further referring to FIG. 3A, switch 304 determines, based on the input from the geolocation of the computing device (201), file classification (202), and domain check (203) whether to open a file stored on the mobile computing device (305) or to encrypt the file stored on the mobile computing device (306). By way of illustration, switch 304 may check domain (203) to determine that there is no overlap of two networks placed in one geolocation. As an example, a corporate network and a nearby coffee shop with network access opened may exhibit an overlap in that both may cover a same geographic location, for example, an office building. Here, both the corporation network and the coffee shop network can be on the same geolocation but only one of them have a valid active directory domain membership. In this case, files stored locally on the mobile computing device will be encrypted (306).

Table 1 below illustrates scenarios for file encryption on the mobile computing device based on a combination of inputs from network identification, trusted geolocation, and criticality classification.

TABLE 1

| Network (Identified) | Trusted Geolocation (Identified) | Critical Classification (Identified) | Clicked file (encrypt) |
|---|---|---|---|
| Yes | Yes | Yes | Unencrypt |
| Yes | Yes | No | Unencrypt |
| Yes | No | No | Unencrypt |
| No | No | No | Unencrypt |
| No | Yes | Yes | Encrypt |
| No | No | Yes | Encrypt |
| Yes | No | Yes | Encrypt |
| No | Yes | No | Unencrypt |

As illustrated, when the identified network is verified to have a valid directory domain membership, and when the identified geolocation is determined as untrusted (or outside a list of trusted zones), and the classification of the file is critical, then the file stored locally on the mobile computing device is to be encrypted. The encryption can use a number of protocols including, for example, symmetrical key encryption based on 3DES (Data Encryption Standard), RSA (Rivest-Shamir-Adleman), Blowfish, Twofish, and AES (Advanced Encryption Standard) algorithms or any other secure protocol or algorithm. In some cases, the file is encrypted by the network server of the enterprise network server when the mobile computing device downloads a copy of the file for local storage. Additionally or alternatively, the file can be encrypted by the mobile computing device when a copy of the file is being transferred from the network server to the mobile computing device. In various implementations, classification can be performed by an independent entity that requires any file to be classified whether on a server or a mobile computing device. However, encryption can be decided only by the internal process if all conditions are met to perform the encryption action. The process will check weather documents has classification and encrypt the document accordingly. Additionally or alternatively, when the identified network is verified to have no valid directory, and the identified geolocation is determined as trusted (or within a list of trusted zones), and the classification of the file is not critical, then the file stored locally on the mobile device can be unencrypted.

Figure 3B:
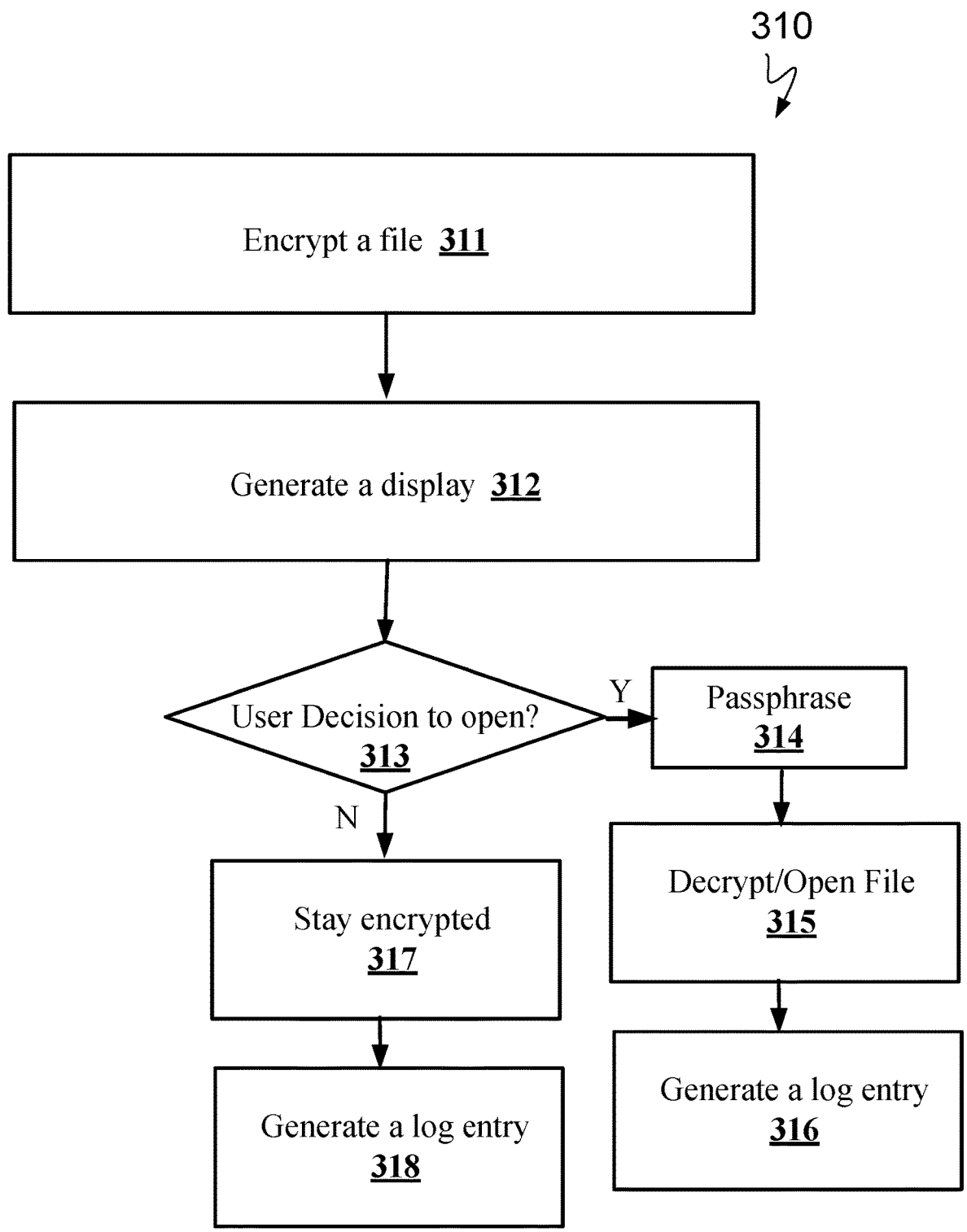

As discussed above, the switch 304 evaluates a geolocation of the mobile computing device (201), a file classification (202), and a domain (203), and then decides where to pursue encryption of the file stored locally on the mobile computing device (306). Further referring to FIG. 3B illustrating a flow chart 310, when the decision is to encrypt the file (311) based on a combination of the factors as outlined above, an interactive display may be generated on the mobile computing device to alert the user of the unsecure location and the recommendation of encrypting the file (312). The information may include a legal disclaimer announcing the consequences of potential data leakage by virtue of decrypting and opening the file. This serves as an alert to the user that the user will be responsible for the consequences of leaking sensitive information in the public or untrusted zone. The user then can make a decision on whether to open the file on the mobile computing device (313). In some cases, the user will be prompted with legal disclaimer. When the user decides to open the file in an unsecure location, the user may be given the option to decrypt the encrypted file by a preconfigured passphrase (314). After receiving the correct passphrase, the process flow may proceed to decrypt and open the file (315). A log alert can be generated (316), which can be sent to corporate security operations for reference. On the other hand, when the user decides not to open the file, the file may stay encrypted on the mobile computing device (317). In this case, a log entry may also be generated (318), which can also be sent to corporate security operations for reference. Additionally or alternatively, the process may override the user and deny access to the file when the mobile computing device is in an unsecure zone. Implementations provide enhanced capability to determine whether the mobile computing device is currently in a secure zone based on the combined factors of current geolocation and current domain membership as well as the classification of the file. For cases when the mobile computing device is nearby the corporate premise but nonetheless also registered at another domain, the implementations may provide additional security.

Figure 4:
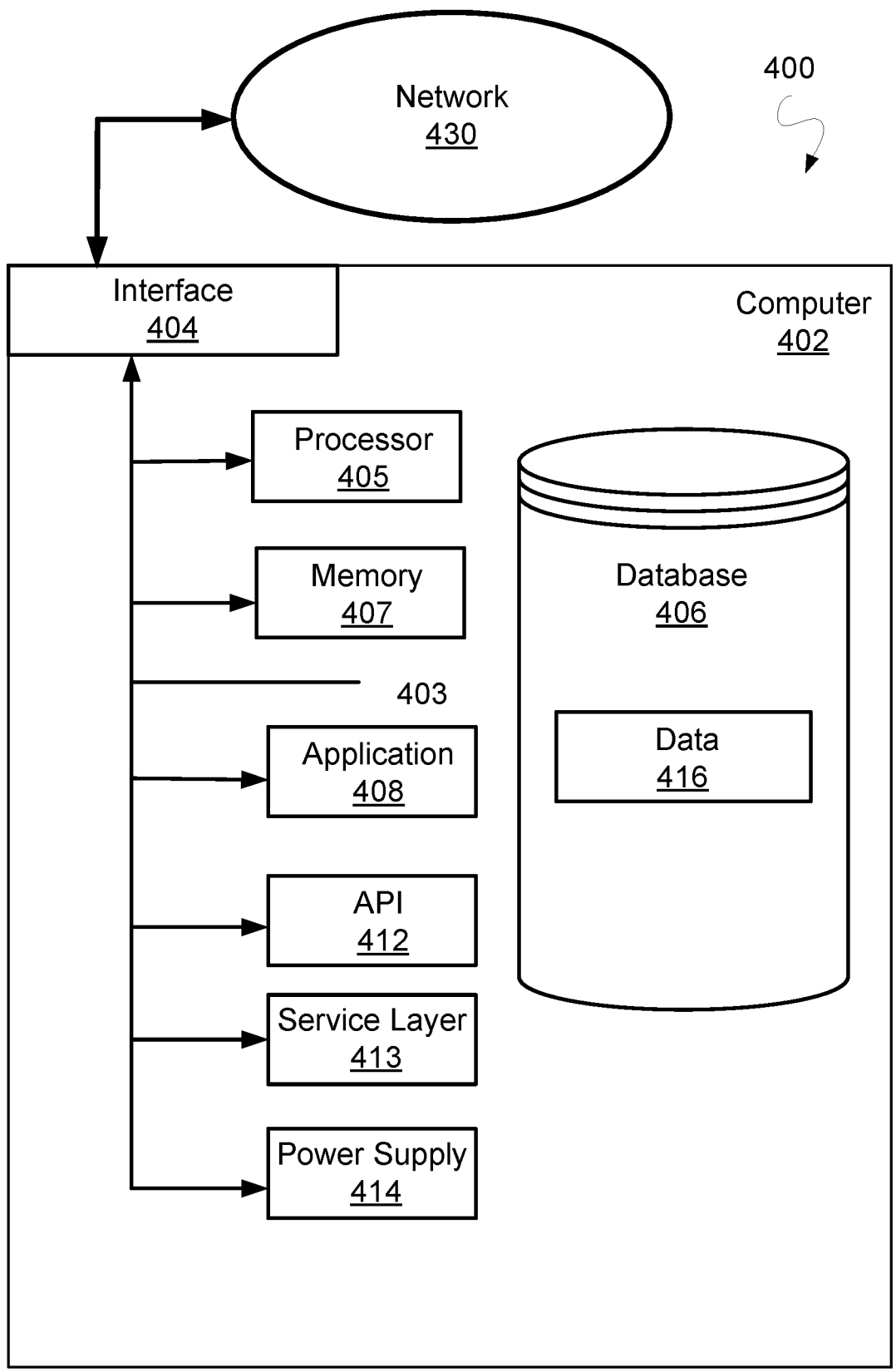
FIG. 4 is a block diagram illustrating an example of a computer system used to provide computational functionalities associated with described algorithms, methods, functions, processes, flows, and procedures, according to an implementation of the present disclosure.

FIG. 4 is a block diagram illustrating an example of a computer system 400 used to provide computational functionalities associated with described algorithms, methods, functions, processes, flows, and procedures, according to an implementation of the present disclosure. The illustrated computer 402 is intended to encompass any computing device such as a server, desktop computer, laptop/notebook computer, wireless data port, smart phone, personal data assistant (PDA), tablet computing device, one or more processors within these devices, another computing device, or a combination of computing devices, including physical or virtual instances of the computing device, or a combination of physical or virtual instances of the computing device. Additionally, the computer 402 can comprise a computer that includes an input device, such as a keypad, keyboard, touch screen, another input device, or a combination of input devices that can accept user information, and an output device that conveys information associated with the operation of the computer 402, including digital data, visual, audio, another type of information, or a combination of types of information, on a graphical-type user interface (UI) (or GUI) or other UI.

The computer 402 can serve in a role in a computer system as a client, network component, a server, a database or another persistency, another role, or a combination of roles for performing the subject matter described in the present disclosure. The illustrated computer 402 is communicably coupled with a network 430. In some implementations, one or more components of the computer 402 can be configured to operate within an environment, including cloud-computing-based, local, global, another environment, or a combination of environments.

The computer 402 is an electronic computing device operable to receive, transmit, process, store, or manage data and information associated with the described subject matter. According to some implementations, the computer 402 can also include or be communicably coupled with a server, including an application server, e-mail server, web server, caching server, streaming data server, another server, or a combination of servers.

The computer 402 can receive requests over network 430 (for example, from a client software application executing on another computer 402) and respond to the received requests by processing the received requests using a software application or a combination of software applications. In addition, requests can also be sent to the computer 402 from internal users, external or third-parties, or other entities, individuals, systems, or computers.

Each of the components of the computer 402 can communicate using a system bus 403. In some implementations, any or all of the components of the computer 402, including hardware, software, or a combination of hardware and software, can interface over the system bus 403 using an application programming interface (API) 412, a service layer 413, or a combination of the API 412 and service layer 413. The API 412 can include specifications for routines, data structures, and object classes. The API 412 can be either computer-language independent or dependent and refer to a complete interface, a single function, or even a set of APIs. The service layer 413 provides software services to the computer 402 or other components (whether illustrated or not) that are communicably coupled to the computer 402. The functionality of the computer 402 can be accessible for all service consumers using this service layer. Software services, such as those provided by the service layer 413, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the computer 402, alternative implementations can illustrate the API 412 or the service layer 413 as stand-alone components in relation to other components of the computer 402 or other components (whether illustrated or not) that are communicably coupled to the computer 402. Moreover, any or all parts of the API 412 or the service layer 413 can be implemented as a child or a sub-module of another software module, enterprise application, or hardware module without departing from the scope of the present disclosure.

The computer 402 includes an interface 404. Although illustrated as a single interface 404 in FIG. 4, two or more interfaces 404 can be used according to particular needs, desires, or particular implementations of the computer 402. The interface 404 is used by the computer 402 for communicating with another computing system (whether illustrated or not) that is communicatively linked to the network 430 in a distributed environment. Generally, the interface 404 is operable to communicate with the network 430 and comprises logic encoded in software, hardware, or a combination of software and hardware. More specifically, the interface 404 can comprise software supporting one or more communication protocols associated with communications such that the network 430 or interface's hardware is operable to communicate physical signals within and outside of the illustrated computer 402.

The computer 402 includes a processor 405. Although illustrated as a single processor 405 in FIG. 4, two or more processors can be used according to particular needs, desires, or particular implementations of the computer 402. Generally, the processor 405 executes instructions and manipulates data to perform the operations of the computer 402 and any algorithms, methods, functions, processes, flows, and procedures as described in the present disclosure.

The computer 402 also includes a database 404 that can hold data for the computer 402, another component communicatively linked to the network 430 (whether illustrated or not), or a combination of the computer 402 and another component. For example, database 406 can be an in-memory, conventional, or another type of database storing data consistent with the present disclosure. In some implementations, database 406 can be a combination of two or more different database types (for example, a hybrid in-memory and conventional database) according to particular needs, desires, or particular implementations of the computer 402 and the described functionality. Although illustrated as a single database 406 in FIG. 4, two or more databases of similar or differing types can be used according to particular needs, desires, or particular implementations of the computer 402 and the described functionality. While database 406 is illustrated as an integral component of the computer 402, in alternative implementations, database 406 can be external to the computer 402. As illustrated, the database 406 holds the previously described data 416 including, for example, an internal CRM database showing the organizational chart of each employee with their supervisor or department head, the taxonomy of vocabulary and linguistic rules to implement natural language processing of the contents of outbound emails.

The computer 402 also includes a memory 407 that can hold data for the computer 402, another component or components communicatively linked to the network 430 (whether illustrated or not), or a combination of the computer 402 and another component. Memory 407 can store any data consistent with the present disclosure. In some implementations, memory 407 can be a combination of two or more different types of memory (for example, a combination of semiconductor and magnetic storage) according to particular needs, desires, or particular implementations of the computer 402 and the described functionality. Although illustrated as a single memory 407 in FIG. 4, two or more memories 407 or similar or differing types can be used according to particular needs, desires, or particular implementations of the computer 402 and the described functionality. While memory 407 is illustrated as an integral component of the computer 402, in alternative implementations, memory 407 can be external to the computer 402.

The application 408 is an algorithmic software engine providing functionality according to particular needs, desires, or particular implementations of the computer 402, particularly with respect to functionality described in the present disclosure. For example, application 408 can serve as one or more components, modules, or applications. Further, although illustrated as a single application 408, the application 408 can be implemented as multiple applications 408 on the computer 402. In addition, although illustrated as integral to the computer 402, in alternative implementations, the application 408 can be external to the computer 402.

The computer 402 can also include a power supply 414. The power supply 414 can include a rechargeable or non-rechargeable battery that can be configured to be either user- or non-user-replaceable. In some implementations, the power supply 414 can include power-conversion or management circuits (including recharging, standby, or another power management functionality). In some implementations, the power-supply 414 can include a power plug to allow the computer 402 to be plugged into a wall socket or another power source to, for example, power the computer 402 or recharge a rechargeable battery.

There can be any number of computers 402 associated with, or external to, a computer system containing computer 402, each computer 402 communicating over network 430. Further, the term "client," "user," or other appropriate terminology can be used interchangeably, as appropriate, without departing from the scope of the present disclosure. Moreover, the present disclosure contemplates that many users can use one computer 402, or that one user can use multiple computers 402.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to a receiver apparatus for execution by a data processing apparatus. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with an operating system of some type, for example LINUX, UNIX, WINDOWS, MAC OS, ANDROID, IOS, another operating system, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and apparatus can also be implemented as, special purpose logic circuitry, for example, a CPU, an FPGA, or an ASIC.

Computers for the execution of a computer program can be based on general or special purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of media and memory devices, magnetic devices, magneto optical disks, and optical memory device. Memory devices include semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Magnetic devices include, for example, tape, cartridges, cassettes, internal/removable disks. Optical memory devices include, for example, digital video disc (DVD), CD-ROM, DVD+/−R, DVD-RAM, DVD-ROM, HD-DVD, and BLURAY, and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or another type of touchscreen. Other types of devices can be used to interact with the user. For example, feedback provided to the user can be any form of sensory feedback. Input from the user can be received in any form, including acoustic, speech, or tactile input. In addition, a computer can interact with the user by sending documents to and receiving documents from a client computing device that is used by the user.

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, Frame Relay frames, Asynchronous Transfer Mode (ATM) cells, voice, video, data, or other information between networks addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what can be claimed, but rather as descriptions of features that can be specific to particular implementations. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method comprising:
   receiving data encoding a current geolocation of a mobile computing device, a classification status of one or more files on the mobile computing device being requested by a user of the mobile computing device, and a current network domain on which the mobile computing device is registered, wherein the classification status indicates whether the one or more files contain sensitive information; and
   based on the current geolocation of the mobile computing device, the classification status of the one or more files on the mobile computing device, and the current network domain of the mobile computing device, determining an encryption status of the one or more files on the mobile computing device, wherein the encryption status indicates whether the one or more files are to be encrypted, or opened.

2. The computer-implemented method of claim 1, further comprising:
   determining that the one or more files are to be encrypted when the classification status indicates that the one or more files contain sensitive information while at least one of the current geolocation or the current network domain is untrusted; and
   in response to determining that the one or more files are to be encrypted, encrypting the one or more files on the mobile computing device.

3. The computer-implemented method of claim 2, further comprising:
   displaying, at a user interface on the mobile computing device, an indication that the one or more files are being encrypted.

4. The computer-implemented method of claim 3, wherein the indication includes a disclaimer regarding potential data leakage by virtue of opening the one or more files.

5. The computer-implemented method of claim 3, further comprising:
   receiving, from the user interface on the mobile computing device, a user selection with regard to the one or more files on the mobile computing device.

6. The computer-implemented method of claim 5, further comprising:
   in response to the user selecting to open the one or more files, soliciting a passphrase from the user.

7. The computer-implemented method of claim 6, further comprising:
   in response to receiving the passphrase, decrypting and opening the one or more files using the passphrase.

8. The computer-implemented method of claim 7, further comprising:
   generating a log entry recording the user accessing contents of the one or more files.

9. The computer-implemented method of claim 5, further comprising:
   in response to the user selecting to not open the one or more files, keeping the one or more files encrypted on the mobile computing device; and
   generating a log entry recording the user attempting to access contents of the one or more files.

10. The computer-implemented method of claim 1, further comprising:
    in response to determining that the one or more files are to be opened, opening the one or more files on the mobile computing device.

11. A computer system comprising one or more processors configured to perform operations of:
    determining a current geolocation of a mobile computing device;
    determining a classification status of one or more files on the mobile computing device being requested by a user of the mobile computing device, wherein the classification status indicates whether the one or more files contain sensitive information;
    determining a current network domain of the mobile computing device; and
    based on the current geolocation of the mobile computing device, the classification status of the one or more files on the mobile computing device, and the current network domain of the mobile computing device, determining an encryption status of the one or more files on the mobile computing device, wherein the encryption status indicates whether the one or more files are to be encrypted, or opened.

12. The computer system of claim 11, wherein the operations further comprise:
    determining that the one or more files are to be encrypted when the classification status indicates that the one or more files contain sensitive information while at least one of the current geolocation or the current network domain is untrusted; and
    in response to determining that the one or more files are to be encrypted, causing the one or more files to be encrypted on the mobile computing device.

13. The computer system of claim 12, wherein the operations further comprises:
    displaying, at a user interface on the mobile computing device, an indication that the one or more files are being encrypted.

14. The computer system of claim 13, wherein the indication includes a disclaimer regarding potential data leakage by virtue of opening the one or more files.

15. The computer system of claim 13, wherein the operations further comprise:
    receiving, from the user interface on the mobile computing device, a user selection with regard to the one or more files on the mobile computing device.

16. The computer system of claim 15, wherein the operations further comprise:
    in response to the user selecting to open the one or more files, soliciting a passphrase from the user.

17. The computer system of claim 16, wherein the operations further comprise:
    in response to receiving the passphrase, decrypting and opening the one or more files using the passphrase.

18. The computer system of claim 17, wherein the operations further comprise:

generating a log entry recording the user accessing contents of the one or more files.

19. The computer system of claim 15, wherein the operations further comprise:
in response to the user selecting to not open the one or more files, keeping the one or more files encrypted on the mobile computing device; and
generating a log entry recording the user attempting to access contents of the one or more files.

20. The computer system of claim 11, wherein the operations further comprise:
in response to determining that the one or more files are to be opened, opening the one or more files on the mobile computing device.

* * * * *